United States Patent
Adelman et al.

(10) Patent No.: US 7,685,102 B2
(45) Date of Patent: *Mar. 23, 2010

(54) METHODS AND APPARATUS FOR OPERATING ON NON-TEXT MESSAGES

(75) Inventors: Jason Adelman, Toronto (CA); Todd Joseph Wongkee, Toronto (CA); Paul Michael Brennan, Toronto (CA); Lloyd Malcolm Florence, Toronto (CA); Richard A. Weiss, McKinney, TX (US)

(73) Assignee: Avaya Inc., Westminister, CO (US)

( * ) Notice: Subject to any disclaimer, the term of this patent is extended or adjusted under 35 U.S.C. 154(b) by 636 days.

This patent is subject to a terminal disclaimer.

(21) Appl. No.: 10/124,248

(22) Filed: Apr. 18, 2002

(65) Prior Publication Data

US 2002/0116377 A1   Aug. 22, 2002

Related U.S. Application Data

(63) Continuation of application No. 09/220,864, filed on Dec. 28, 1998, now Pat. No. 6,631,368.

(60) Provisional application No. 60/108,448, filed on Nov. 13, 1998.

(51) Int. Cl.
G06F 7/00 (2006.01)
G06F 17/30 (2006.01)
H04M 1/64 (2006.01)

(52) U.S. Cl. .................. 707/3; 379/88.08
(58) Field of Classification Search ........ 707/3; 704/243; 358/402; 379/100.08, 67; 340/825.44
See application file for complete search history.

(56) References Cited

U.S. PATENT DOCUMENTS

| 4,375,083 | A | * | 2/1983 | Maxemchuk | ........... 704/278 |
| 4,931,950 | A | | 6/1990 | Isle et al. | |
| 5,051,924 | A | | 9/1991 | Bergeron et al. | ...... 364/513.5 |
| 5,125,022 | A | | 6/1992 | Hunt et al. | |

(Continued)

FOREIGN PATENT DOCUMENTS

| EP | 0780777 A1 | 6/1997 |
| EP | 0856979 A2 | 8/1998 |

OTHER PUBLICATIONS

"Method Of Categorizing Concatenated Phone Messages into Message Logs" IBM Technical Disclosure Bulletin, vol. 36, No. 098 Sep. 1993; pp. 297-299.*

(Continued)

*Primary Examiner*—Jean B. Fleurantin
*Assistant Examiner*—Aleksandr Kerzhner

(57) ABSTRACT

Methods and apparatus for operating on a non-text (voice or fax) message include for each of a number of voice messages, searching each voice message for signal samples having one of a plurality of sets of pre-defined characteristics (such as any seven or ten digit number which is then assumed to be a telephone number). For each signal sample found to have one of the sets of pre-defined characteristics, the found signal sample is associated with an equivalent text string and this text string is stored in an envelope for the message. Based on a user input, the messages may be searched for a given text string and on finding a message envelope containing the given text string, such message may be operated upon.

15 Claims, 5 Drawing Sheets

U.S. PATENT DOCUMENTS

| | | | |
|---|---|---|---|
| 5,173,853 A | 12/1992 | Kelly et al. | |
| 5,187,735 A | 2/1993 | Garcia et al. | |
| 5,228,110 A | 7/1993 | Steinbiss | |
| 5,287,199 A * | 2/1994 | Zoccolillo | 358/402 |
| 5,333,266 A * | 7/1994 | Boaz et al. | 379/100.08 |
| 5,384,892 A | 1/1995 | Strong | |
| 5,390,279 A | 2/1995 | Strong | |
| 5,425,128 A | 6/1995 | Morrison | |
| 5,434,907 A | 7/1995 | Hurst et al. | |
| 5,452,341 A * | 9/1995 | Sattar | 379/88.27 |
| 5,459,482 A * | 10/1995 | Orlen | 345/87 |
| 5,479,411 A * | 12/1995 | Klein | 358/402 |
| 5,509,104 A * | 4/1996 | Lee et al. | 704/256 |
| 5,526,407 A * | 6/1996 | Russell et al. | 379/88.01 |
| 5,528,739 A | 6/1996 | Lucas et al. | |
| 5,530,740 A | 6/1996 | Irribarren et al. | |
| 5,566,229 A | 10/1996 | Hou et al. | |
| 5,588,009 A | 12/1996 | Will | |
| 5,634,020 A * | 5/1997 | Norton | 715/727 |
| 5,640,590 A | 6/1997 | Luther | |
| 5,647,002 A | 7/1997 | Brunson | |
| 5,649,060 A | 7/1997 | Ellozy et al. | 395/2.87 |
| 5,668,928 A | 9/1997 | Groner | |
| 5,699,089 A * | 12/1997 | Murray | 715/823 |
| 5,717,743 A | 2/1998 | McMahan et al. | |
| 5,719,921 A | 2/1998 | Vysotsky et al. | |
| 5,796,394 A | 8/1998 | Wicks et al. | |
| 5,796,806 A | 8/1998 | Birckbichler | 379/67 |
| 5,813,009 A | 9/1998 | Johnson et al. | 707/100 |
| 5,848,130 A * | 12/1998 | Rochkind | 379/88.01 |
| 5,870,549 A | 2/1999 | Bobo, II | |
| 5,881,233 A * | 3/1999 | Toyoda et al. | 358/402 |
| 5,905,448 A * | 5/1999 | Briancon et al. | 340/7.43 |
| 5,930,700 A * | 7/1999 | Pepper et al. | 455/435.3 |
| 5,943,400 A * | 8/1999 | Park | 379/88.22 |
| 5,956,298 A * | 9/1999 | Gough | 369/29.01 |
| 5,966,691 A * | 10/1999 | Kibre et al. | 704/260 |
| 5,983,187 A * | 11/1999 | Haddock | 704/275 |
| 5,991,365 A | 11/1999 | Pizano et al. | |
| 6,014,427 A | 1/2000 | Hanson et al. | |
| 6,014,436 A | 1/2000 | Florence et al. | |
| 6,018,710 A * | 1/2000 | Wynblatt et al. | 704/243 |
| 6,020,980 A | 2/2000 | Freeman | |
| 6,023,675 A | 2/2000 | Bennett et al. | 704/235 |
| 6,023,700 A | 2/2000 | Owens et al. | |
| 6,025,931 A | 2/2000 | Bloomfield | |
| 6,034,970 A * | 3/2000 | Levac et al. | 370/466 |
| 6,035,017 A * | 3/2000 | Fenton et al. | 379/88.04 |
| 6,058,435 A | 5/2000 | Sassin et al. | 709/305 |
| 6,061,506 A | 5/2000 | Wollaston et al. | |
| 6,069,940 A * | 5/2000 | Carleton et al. | 379/88.04 |
| 6,073,165 A | 6/2000 | Narasimhan et al. | |
| 6,088,428 A * | 7/2000 | Trandal et al. | 379/88.04 |
| 6,104,500 A | 8/2000 | Alam et al. | |
| 6,125,341 A | 9/2000 | Raud et al. | |
| 6,134,313 A | 10/2000 | Dorfman et al. | 379/201 |
| 6,148,063 A | 11/2000 | Brennan et al. | |
| 6,148,329 A | 11/2000 | Meyer | |
| 6,157,706 A | 12/2000 | Rachelson | |
| 6,167,119 A * | 12/2000 | Bartholomew et al. | 379/88.04 |
| 6,185,603 B1 | 2/2001 | Henderson et al. | |
| 6,233,318 B1 * | 5/2001 | Picard et al. | 379/88.17 |
| 6,278,772 B1 | 8/2001 | Bowater et al. | 379/88.13 |
| 6,298,372 B1 | 10/2001 | Yoshikawa | |
| 6,301,619 B1 | 10/2001 | Segman | |
| 6,317,484 B1 * | 11/2001 | McAllister | 379/88.02 |
| 6,350,066 B1 * | 2/2002 | Bobo, II | 709/206 |
| 6,438,520 B1 * | 8/2002 | Curt et al. | 704/254 |
| 6,606,373 B1 * | 8/2003 | Martin | 379/88.01 |
| 6,631,368 B1 * | 10/2003 | Adelman et al. | 707/4 |
| 6,941,273 B1 * | 9/2005 | Loghmani et al. | 705/26 |
| 6,961,410 B1 * | 11/2005 | Castagna | 379/88.23 |
| 2002/0116377 A1 * | 8/2002 | Adelman et al. | 707/3 |

OTHER PUBLICATIONS

IBM Technical Disclosure Bulletin, vol. 36, No. 6B, Jun. 1993, New York, US, pp. 169-170, XP000377340 "Categorical Storage of Voice Mail Messages".*

K Nahrstedt, J Smith—Univ. of Pennsylvania, Tech. Rep., Jun. 1993. The integrated media approach to networked multimedia systems.*

M.G. Brown, et al.: "Open-Vocabulary Speech Indexing for Voice and Video Mail Retrieval," Proceedings of ACM Multimedia 96, Boston, Nov. 18-22, 1996, New York, ACM, U.S., pp. 307-316, No. XP000734729.

"Method for Enhanced Messaging Service", IBM Technical Disclosure Bulletin, IBM Corp., New York, U.S. vol. 36, No. 8, Aug. 1, 1993, pp. 405-407, No. XP000390273.

11 information sheets on the Octel Unified Messenger™ with a 1996-1997 copyright notice.

Brennan et al., "Should We or Shouldn't We Use Spoken Commands in Voice Interfaces," Human Factors in Computing Systems Conf. on Reaching Through Technology, pp. 369-372, Apr. 27-May 2, 1991.

Alwang, Greg, "Webley", PC Magazine, Jul. 20, 1999, pp. 1-2.

Lawrence R. Rabiner, "A Tutorial on Hidden Markov Models and Selected Applications in Speech Recognition," Proceedings of the IEEE, vol. 77, No. 2, Feb. 1989, pp. 257-286.

* cited by examiner

METHODS AND APPARATUS FOR OPERATING ON NON-TEXT MESSAGES

CROSS-REFERENCE TO RELATED APPLICATION

This is a continuation of application Ser. No. 09/220,864 filed Dec. 28, 1998 now U.S. Pat. No. 6,631,368. This application claims the benefit, under 35 U.S.C. 119(e), of U.S. provisional application No. 60/108,448 filed Nov. 13, 1998. This application is related to application Ser. No. 09/220,865 filed Dec. 28, 1998, the contents of which are incorporated herein by reference.

BACKGROUND OF THE INVENTION

The present invention relates to methods and apparatus for operating on messages, and more particularly for operating on non-text messages, such as voice and facsimile messages, including, for example, searching such messages.

Modern communications technology has produced voice mail, faxes, e-mail, video conferencing and many other ways to send messages.

The growth in voice mail systems has been explosive. In 1996, telephone company revenues generated by providing Voice Mail service exceeded one billion dollars. While business users typically buy voice mail systems, residential customers buy this service from telephone companies. The residential market accounts for 82% of telephone company voice mail subscribers and 69% of revenues generated. Thus, voice mail and faxes are fully part of the daily communications fabric.

In the last twenty years the use of facsimile messaging (fax) has also exploded. The cost of fax machines has decreased steadily, and with the advent of computer telephony (CT), faxes can be received and sent via local area networks (LANs) directly to computers on the user's desktop, eliminating the need to even walk down the hall to the fax machine.

Known systems will collect all digital communications, display the time of receipt, the source of the message, and indicate whether it is voice mail, a fax, or e-mail.

With known systems, a user with a telephone system and a computer can quickly become inundated with information. As such, it is important to be able to separate important messages, or messages which contain key information, from routine messages or electronic junk mail. With known systems this is difficult. In addition, finding key elements of messages can be time consuming and difficult, if not impossible. Known systems provide functions for finding, filtering, filing and re-directing textual messages (e.g., e-mail) but do not do so for voice or facsimile messages.

SUMMARY OF THE INVENTION

The present invention solves these problems by providing a way for searching for, or through, non-text messages to find certain information, or to determine if certain information is included therein, and/or for performing other operations thereon. In conjunction with the present invention, a search is undertaken for one or more signal samples having pre-defined characteristics by comparing one or more signal samples of non-text messages with these pre-defined characteristics. For example, the pre-defined characteristics may comprise one or more templates for voice samples which make up a specific word (e.g., "urgent"). In that case, these voice templates may be compared with signal samples of a voice message in a search for signal samples which match these voice templates.

In addition, and in accordance with the present invention, a non-text message having pre-defined characteristics may be operated upon to provide a desired result (e.g., forwarded).

Therefore, in accordance with the present invention, there is provided a method for operating on a non-text message including searching the message for one or more signal samples having pre-defined characteristics by comparing one or more signal samples with the pre-defined characteristics.

In accordance with a further aspect of the invention, there is provided a method for operating on a non-text message, including searching the message for one or more signal samples having pre-defined characteristics and upon finding one or more signal samples having the pre-defined characteristics, operating on the message.

In accordance with another aspect of the invention, there is provided an apparatus for operating on a non-text message, including a non-text search engine for searching the message for one or more signal samples having pre-defined characteristics by comparing one or more signal samples with the pre-defined characteristics.

In accordance with another aspect of the invention, there is provided apparatus for operating on a non-text message, including: a unit for searching the message for one or more signal samples having pre-defined characteristics; and a unit for, upon finding one or more signal samples having the pre-defined characteristics, operating on the message.

BRIEF DESCRIPTION OF THE DRAWINGS

In the figures, which illustrate example embodiments of the invention.

DETAILED DESCRIPTION OF THE PREFERRED EMBODIMENTS

Figure 1:
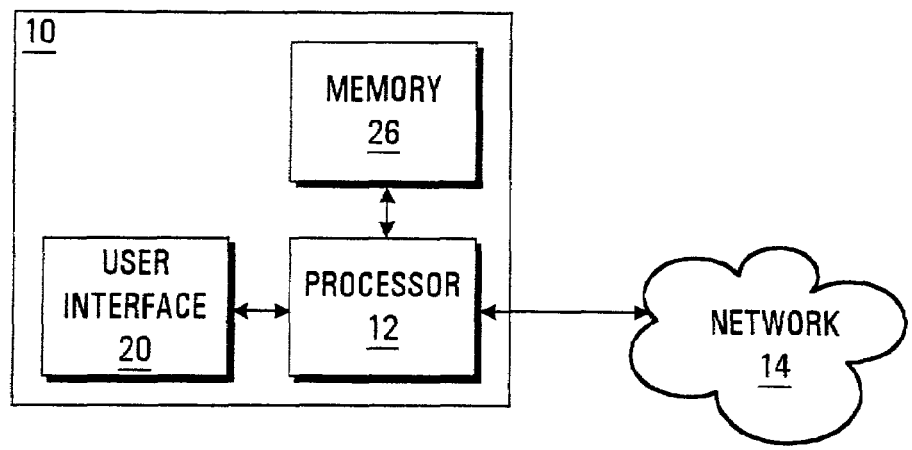
FIG. 1 is a block diagram of an apparatus in accordance with this invention connected to a network.

FIG. 1 shows an apparatus 10 in accordance with the invention which can search for information in one or more non-text messages and perform other operations thereon. Apparatus 10 is connected via its processor 12 for two-way communication with a digital network 14. Network 14 has non-text based message traffic and may also have text-based message traffic. The network 14 may comprise any communications network, including, for example, an internet, intranet, or telephone network.

The non-text messages may be voice messages, video messages with a voice component, or facsimile messages (which, as will be understood by those skilled in the art, are graphics messages which typically include text in graphical form). As will be appreciated by those skilled in the art, the messages with a voice component comprise quantised analog voice signals. The text-based messages are digital messages according to the text standard of the network, which is typically the ASCII standard such that the text-based messages comprise ASCII characters.

The processor 12 is also connected for two-way communication with a user interface 20 and with a memory 26. Memory 26 may comprise any appropriate kind of volatile and/or non-volatile memory.

Figure 2:
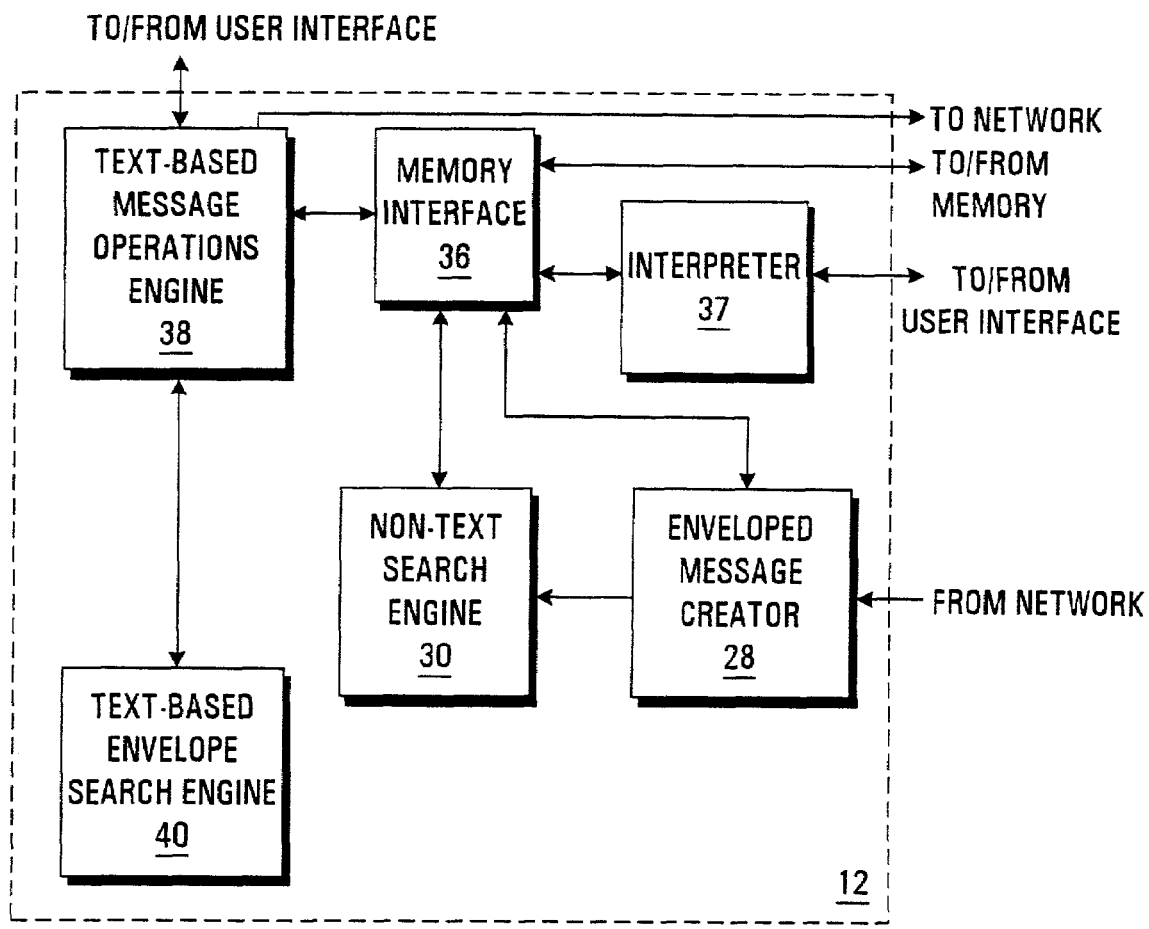
FIG. 2 is a block diagram of a processor which is part of the apparatus of FIG. 1.

As seen in FIG. 2, the processor 12 includes an enveloped message creator 28 which receives inputs from the network and outputs to a non-text search engine 30 and a memory interface 36. The non-text search engine 30 is connected for two-way communication with the memory interface 36. The memory interface interfaces with the memory 26 (FIG. 1) and is also connected for two-way communication with an interpreter 37 and a text-based message operations engine 38. The interpreter 37 interfaces with the user interface. The text-based message operations engine 38 also interfaces with the user interface and is connected for two-way communication with a text-based envelope search engine 40.

The memory 26 (FIG. 1) stores an envelope shell. Briefly referencing FIG. 3, the format of this shell (which will be detailed hereinafter) is illustrated at 52. Memory 26 also stores sets of pre-defined characteristics. Each set of pre-defined characteristics comprises voice templates or facsimile graphics templates along with an arrangement for the templates. Text-based equivalents are associated with each template (for example, the text-based equivalent associated with a template may be a letter, a collection of letters, a number, or a collection of numbers). Thus, where a set of pre-defined characteristics comprises voice templates, an equivalent text-based letter, collection of letters, words, number, or numbers to which such voice templates map is stored in association therewith. Alternatively, where the set of pre-defined characteristics comprises facsimile graphics templates, equivalent text-based words, numbers, etc. to which the graphics templates map are stored therewith.

Figure 4A:
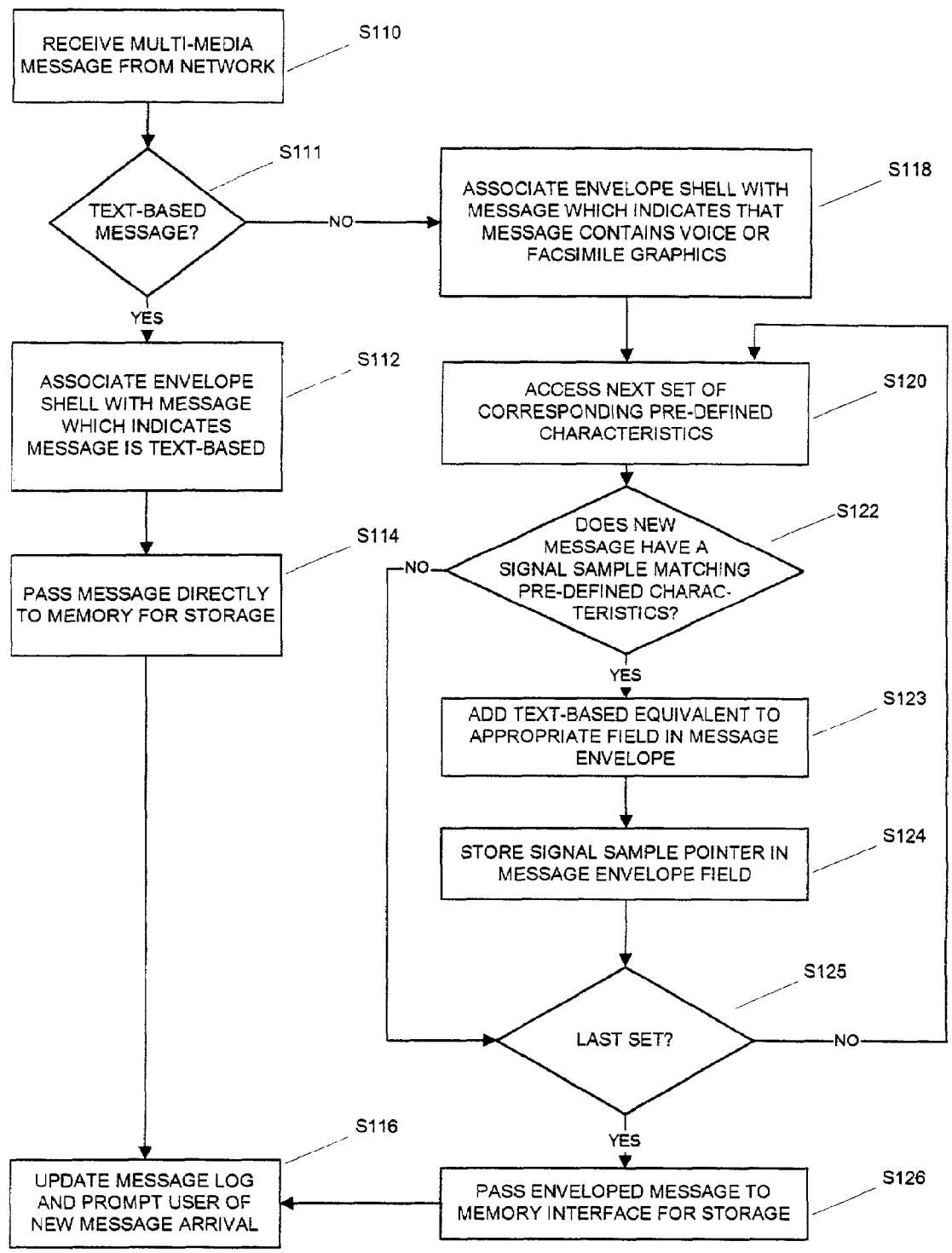

FIG. 4a provides a flow chart of a method in accordance with this invention for handling new messages; the operation of this method may be carried out by processor 12 in the system of FIGS. 1 and 2. In conjunction with the invention, multi-media messages may be received by the enveloped message creator 28 of processor 12 (S110) from network 14. Typically, a header for these messages indicates their type—i.e., voice, fax, e-mail. (In this regard, it will be appreciated that a message may be of multiple types with a multi-part header to indicate each type.) In other instances, the type may be implicit based on the source (e.g., messages arriving from a fax application will be fax messages). In this regard, a simple look-up table may be employed to associate message sources with default types. The message type determines whether the message is natively text-based or natively non-text based (or partly natively text and partly natively non-text).

If a new message is natively text-based (S111), the enveloped message creator 28 associates an envelope shell with the message which merely indicates in message type area 60 (FIG. 3) of the shell 52 (FIG. 3) it has a text-based native form (S112). Then, the processor passes the message directly to memory 26 for storage (S114) as well as updating a message log and prompting the user that a new message has arrived (S116) in accordance with a manner known to persons skilled in the art.

If the message is a natively non-text message (or has a non-text component) (S111), the enveloped message creator associates an envelope shell with the message, and indicates in area 60 (FIG. 3) the message contains voice or facsimile graphics. The message creator then passes the enveloped message to non-text search engine 30 (S118). The non-text search engine 30 accesses a set of pre-defined characteristics found in memory 26. If the incoming message is a voice message, the accessed set of pre-defined characteristics comprises voice templates; if the incoming message is a facsimile message, the accessed set of pre-defined characteristics comprises facsimile templates (S120). For example, if the incoming message is a voice message, the set of pre-defined characteristics may comprise voice templates for the digits 0 to 9, arranged so that all digit strings of seven and ten digits in length (i.e., a phone number) match the set. The search engine then searches through the message for one or more (sequential) voice samples matching one of the digit templates. If a match is found, the engine looks to the next sample(s). If the next sample(s) also match a digit template, the search looks to the following samples and so on until either sequential voice samples are found to match seven or ten digit templates or this number of matches is not found, in which case searching continues for the next place in the message to have one or more voice samples matching one of the digit templates. By way of a further example, the incoming message may be a fax message, the set of pre-defined characteristics may comprise facsimile templates arranged to make up the word "urgent" and each facsimile template may comprise one letter. The search engine then searches through the fax message for one or more (sequential) fax samples matching the facsimile template for the letter "u". If this is found, the engine looks to the next one or more samples for a facsimile sample matching the letter "r", and so on. Techniques for speech and facsimile graphics recognition are well known in the art.

If the new message is found to contain one or more signal samples falling within a set of pre-defined characteristics (S122), then the text-based equivalent of the corresponding template(s) is added to slot 62 (FIG. 3) of a field 56 (FIG. 3) in the envelope of the message (S123). In addition, for found signal sample(s), one or more signal sample pointers are stored in a slot 64 (FIG. 3) in the field which points to the location in the non-text message of the found signal samples (S124).

If the new message does not contain one or more signal samples falling within a given set of pre-defined characteristics, then the slots for the text based equivalent 62 and signal sample pointer 64 of the field 56 for the relevant search are set to null. This process is repeated for each of the sets of pre-defined characteristics in memory (S125). Thereafter, the non-text search engine 30 passes the enveloped message to the memory interface 36 for storage in memory 26 (S126) and the message log is updated and the user is prompted (S116).

Sets of pre-determined characteristics may be accessed sequentially from the memory 26. The results of sequential searches following from sequentially accessed sets of pre-defined characteristics may be stored in sequential fields of the envelope so that each field ID 58 is an ordinal representing a search number. Alternatively, each field ID may be populated by the non-text search engine with a description of the search and a pointer to the memory area in which the set of pre-defined characteristics is found.

The sets of predefined characteristics are handled as standing search requests which are applied to each new message which is received. When a new set of pre-defined characteristics is added, optionally, a search of all existing messages may be undertaken based on the new set.

Figure 4B:
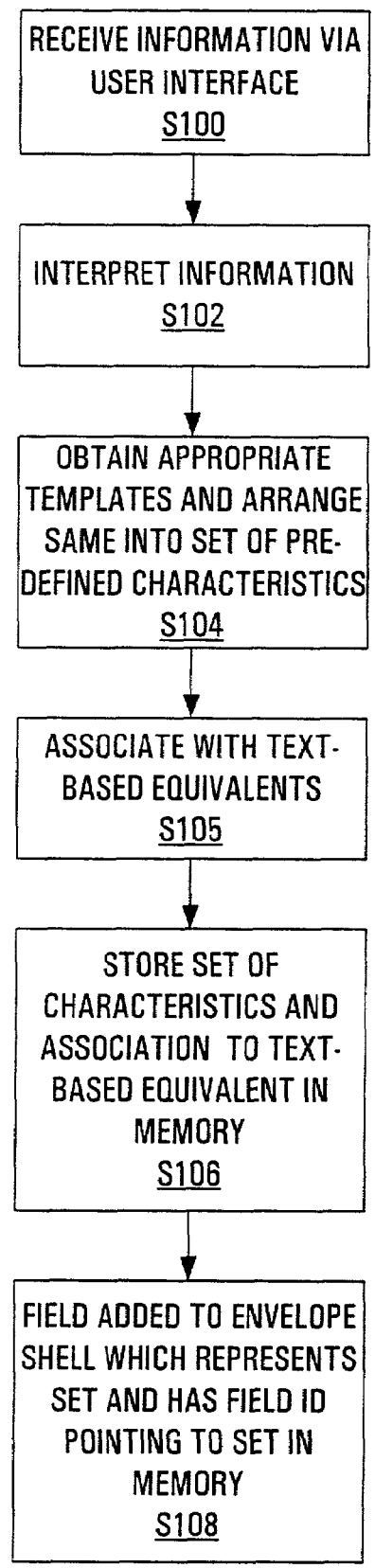

A new set of pre-defined characteristics may be specified by a user as follows. Referencing FIG. 4b along with FIGS. 1 and 2, a user may enter information in order to specify a set of characteristics through user interface 20—which may comprise a keyboard, mouse, microphone, or other input device along with a display and a speaker (S100). Interpreter 37 interprets the information input by the user to facilitate the creation of a set of pre-defined characteristics (S102). For example, the interpreter 37 may present a graphical user interface (GUI) to the user. The user could then use the GUI to indicate, for example, that a specific word (e.g., "urgent") is to form the basis of a set of pre-defined characteristics whereupon the GUI would allow entry of the word. The user could also specify whether the set is to apply to voice messages, facsimile message, or both voice and facsimile messages. The interpreter then obtains the necessary templates and arranges these appropriately to create the new set of pre-defined characteristics (S104). In the case of an entered word to be applied to both voice and facsimile messages, the resulting set of characteristics constitutes voice templates and facsimile templates arranged to make the specific word. Preferably, the search interpreter 37 obtains the necessary templates from memory 26 which may store templates for voice and facsimile graphics. The search interpreter also associates each template with a text-based equivalent (S105). Memory 26 also preferably stores the text-based equivalent to which each template maps to facilitate an association of any given set of templates with text-based equivalents. The new set of characteristics is then stored in memory 26 along with an association to the text-based equivalents (S106), and a field is added to the envelope shell for this set which has a field ID pointing to the set in memory (S108).

Figure 3:
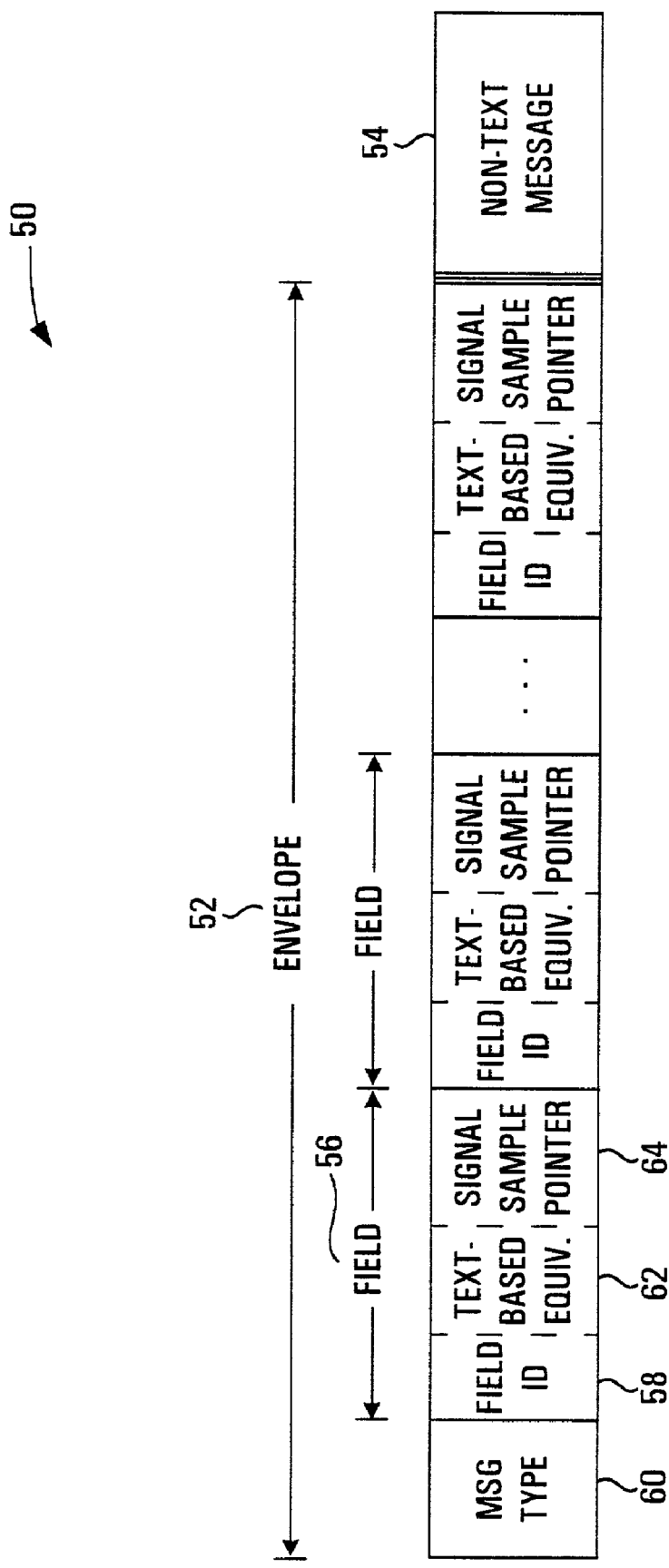
FIG. 3 is a schematic diagram of a message structure created by the apparatus of FIG. 1, and FIGS. 4a, 4b, and 4c are flow diagrams of methods in accordance with the invention.
Figure 4C:
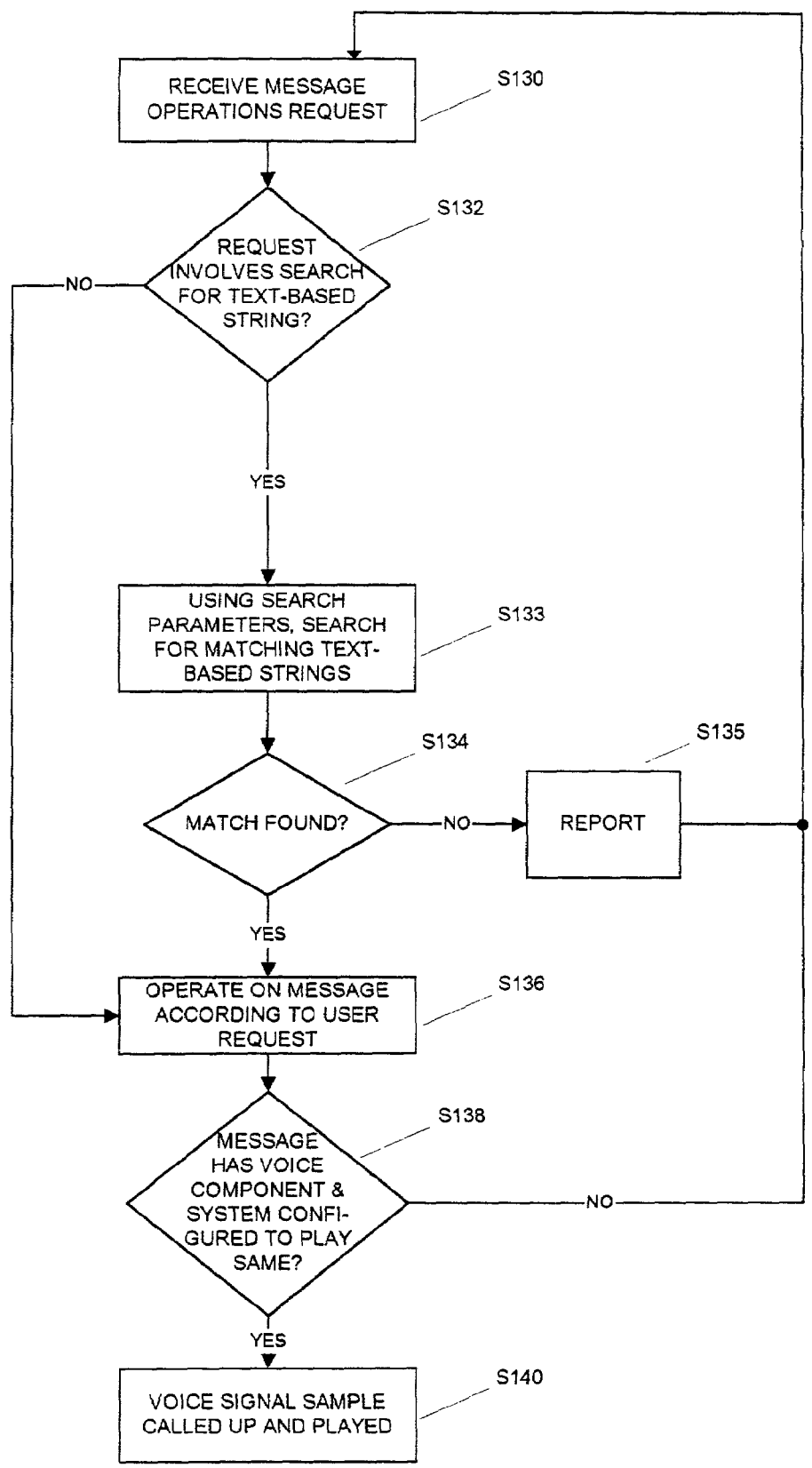

FIG. 4c provides a flow chart of a method in accordance with this invention for the handling of user message operations requests. Referencing FIG. 4c, along with FIGS. 1 and 2, through user interface 20, a user may input a message operation request to processor 12 (S130). For example, the user may ask that any telephone number which might be part of a specified message be dialled or placed in a directory (i.e., stored separately from the message), that any URL found in a message from a certain sender be added to a bookmark file or sent to a browser program to allow access to an internet resource (e.g., web page), or that all messages containing certain keywords (e.g., messages containing the words "low priority") be deleted or played back. The message operation request is input to the text-based message operations engine 38. If the request involves a search for a text-based string (e.g., the word "urgent") (S132), the search parameters (e.g., message number of a specified message or an indication all messages are to be searched, along with an indication of the text-based string or strings which will satisfy the search) are passed to the text-based envelope search engine 40. The search engine searches the envelopes of all or specified messages for any text-based strings falling within the search parameters (S133). On finding such a string (or strings) (S134), the engine identifies the message number and string(s) to the text-based operations engine 38. The operations engine then operates on the message in accordance with the user's request (S136). This could involve, for example, automatically dialling a telephone number found in the envelope for a specified message or deleting, filing, or playing specified messages or messages from a specified sender. Also, the message, or a copy thereof, could be forwarded. In addition, where the message has a voice component, the system may be configured so that the operations engine 38 utilises the signal sample pointers 64 (FIG. 3) in the envelope field for a found string to call up the voice signal sample(s) represented by the string and play this on a speaker which is part of the user interface (S138, S140). Similarly, a fax message may have a sample called up and displayed. This would be useful where, for example, the search was for digit strings representing telephone numbers.

Optionally, the signal sample pointers 64 may be omitted and, where a message comprises a voice component, the message operations engine may pass the text-based equivalent to a voice synthesizer (which may be part of the user interface) to play a voice equivalent.

As will be appreciated by those skilled in the art, the automatic dialling may be effected by sending a message on network 14 (or other communication path) to an automatic dialler or computer telephony interface.

If no matches are found, the processor simply reports this to the user (S135). If the message operations request does not have search parameters, but instead identifies a specific message or messages, program control passes from S132 to S136.

As should be apparent from FIG. 3, the envelope 52 may be added as a header to the non-text message 54. Thus, the enveloped message 50 comprises a text-based envelope 52 and a non-text (or text-based) message 54. Many existing messaging systems, such as MICROSOFT EXCHANGE™, include an expandable envelope structure for messages. In such a case, the existing envelope structure may be used and the enveloped message creator 28 may be unnecessary. Additional fields may then be associated with the existing envelope structure.

In an alternate and simplified embodiment, only the signal sample pointers 64 may be stored in a message envelope field on finding one or more signal samples falling with a set of pre-defined characteristics (and not the text-based equivalent). In this case, a user could request the system to play/display the signal samples pointed to by the sample pointers. For example, a set of pre-defined characteristics may identify messages from one of several specified company departments. The user could then, on request, hear/see these departments and then decide upon further action based on this information.

In another embodiment, messages may be enveloped and searches for sets of pre-defined characteristics conducted and ensuing operations undertaken as aforedescribed in conjunction with FIGS. 1 to 4. However, additionally, a user may define a set of pre-defined characteristics which, instead of being stored in memory for use in conjunction with new messages, is searched for immediately in an existing message or group of messages specified by the user. Any message containing this set of pre-defined characteristics may then be further operated upon based on an operation entered by the user or recalled from memory.

In a further embodiment, it is not necessary to envelope new messages. In this embodiment, non-text messages are searched for sets of pre-defined characteristics, and after finding one or more signal samples falling within a set of pre-defined characteristics, the apparatus immediately performs an operation on the message (e.g., the message is deleted). This operation could be one entered by the user or recalled from memory. In another aspect of this embodiment, after finding one or more signal samples falling within a set of predefined characteristics, the one or more signal samples are mapped to a text-based equivalent and the apparatus then takes action based on the text-based equivalent (e.g., dial a telephone number) rather than storing the text-based equivalent and/or pointer thereto in an envelope for the message.

Other modifications in accordance with the spirit of the invention will be apparent to those skilled in the art.

What is claimed is:

1. A method of operating on a non-text message, comprising:

searching said non-text message for one or more signal samples having pre-defined characteristics by comparing said one or more signal samples with a stored template having said pre-defined characteristics, said pre-defined characteristics having associated therewith a stored text-based equivalent;

upon finding one or more signal samples having said pre-defined characteristics, storing one or more pointers pointing to said found signal samples in said non-text message;

upon finding one or more signal samples having said pre-defined characteristics, associating a text string with said found signal samples;

storing said text string in an envelope for said non-text message; and storing said one or more pointers in said envelope in association with said text string.

2. A method of operating on a non-text message, comprising:

searching said non-text message for one or more signal samples having pre-defined characteristics by comparing said one or more signal samples with a stored template having said pre-defined characteristics, said pre-defined characteristics having associated therewith a stored text-based equivalent;

upon finding one or more signal samples having said pre-defined characteristics, storing one or more pointers pointing to said found signal samples in said non-text message;

upon finding one or more signal samples having said pre-defined characteristics further operating on said non-text message; and wherein said one or more signal samples having said pre-defined characteristics has an associated string of digits, and wherein said further operating on said non-text message comprises dialing said string of digits.

3. A method of operating on non-text messages comprising:

for each of one or more non-text messages, searching each non-text message for one or more signal samples falling within one of a plurality of sets of pre-defined characteristics, each said one of said plurality of sets of pre-defined characteristics comprising at least one stored template having a pre-defined characteristic having associated therewith a stored text-based equivalent;

for each one or more signal samples found to fall within one of said sets of pre-defined characteristics, storing one or more pointers pointing to said found signal samples in association with said one of said sets of pre-defined characteristics in a message envelope for said each non-text message;

for each one or more signal samples found to fall within one of said sets of pre-defined characteristics, storing a text string in said message envelope for said each non-text message based on text-based equivalents to said one or more sets of pre-defined characteristics;

based on a user input, searching at least one said message envelope for at least one text string;

on finding one message envelope containing said at least one text string, operating on said non-text message associated with said found message envelope; and wherein said user input requests a search for said at least one a text string representing at least one keyword and wherein said searching comprises searching said at least one message envelope for said at least one keyword.

4. A method of operating on non-text messages comprising:

for each of one or more non-text messages, searching each non-text message for one or more signal samples falling within one of a plurality of sets of pre-defined characteristics, each said one of said plurality of sets of pre-defined characteristics comprising at least one stored template having a pre-defined characteristic having associated therewith a stored text-based equivalent;

for each one or more signal samples found to fall within one of said sets of pre-defined characteristics, storing one or more pointers pointing to said found signal samples in association with said one of said sets of pre-defined characteristics in a message envelope for said each non-text message;

for each one or more signal samples found to fall within one of said sets of pre-defined characteristics, storing a text string in said message envelope for said each non-text message based on text-based equivalents to said one or more sets of pre-defined characteristics;

based on a user input, searching at least one said message envelope for at least one text string;

on finding one message envelope containing said at least one text string, operating on said non-text message associated with said found message envelope; and wherein said user input requests a search for any telephone number and wherein said step of searching for said at least one text string comprises searching for any string of digits of a length representing a telephone number.

5. The method of claim 4 wherein said operating on said non-text message comprises dialing said at least one text string as a telephone number.

6. Apparatus for performing an operation on a message, comprising:

a non-text search engine arranged to search said message for one or more signal samples having pre-defined characteristics by comparing one or more signal samples with a stored template having said pre-defined characteristics, said pre-defined characteristics having associated therewith a stored text-based equivalent;

means for, upon finding one or more signal samples having said pre-defined characteristics, storing a pointer pointing to said found signal samples in said message; and a memory storing text-based equivalents in association with said pre-defined characteristics for, upon said non-text search engine finding one or more signal samples having said pre-defined characteristics, associating a text string with said message.

7. The apparatus of claim 6 further comprising:

a text-based message operations engine to search text strings associated with said message for a given text string and, upon finding said given text string, further operating on said message.

8. Apparatus for operating on non-text messages comprising:

means for, for each of one or more non-text messages, searching each non-text message for one or more signal samples falling within one of a plurality of sets of pre-defined characteristics, each said one of said plurality of sets of pre-defined characteristics comprising at least one stored template having a pre-defined characteristic having associated therewith a stored text-based equivalent;

for each one or more signal samples found to fall within one or said sets of pre-defined characteristics, storing one or more pointers pointing to said found signal samples in association with said one of said sets of pre-defined characteristics in a message envelope for said each non-text message; and means for, for each one or more signal samples found to fall within one of said sets of pre-defined characteristics, storing a text string in said message envelope for said each non-text message based on text-based equivalents to said one or more sets of pre-defined characteristics.

9. The apparatus of claim 8 further comprising:
means for, based on a user input, searching each said message envelope for a text string having certain characteristics; and
means for, on finding one message envelope containing said text string having said certain characteristics, operating on said non-text message associated with said found message envelope.

10. A method of operating on a non-text message, comprising:
searching said non-text message for one or more signal samples having pre-defined characteristics by comparing said one or more signal samples with a stored template having said pre-defined characteristics, said pre-defined characteristics having associated therewith a stored text-based equivalent;
upon finding one or more signal samples having said pre-defined characteristics, storing one or more pointers pointing to said found signal samples in said non-text message;
storing said one or more pointers pointing to said found signal samples in an envelope for said non-text message;
wherein said searching comprises, for each set of a plurality of sets of pre-defined characteristics, searching said non-text message for one or more signal samples having said each set of pre-defined characteristics; and
storing said one or more pointers in said envelope in association with an ordinal, each ordinal representing a search for one of said sets of pre-defined characteristics.

11. The method of claim 10 wherein said sets of pre-defined characteristics are sets of characteristics specified by a user through a user interface.

12. A method of operating on a non-text message, comprising:
searching said non-text message for one or more signal samples having pre-defined characteristics by comparing said one or more signal samples with a stored template having said pre-defined characteristics, said pre-defined characteristics having associated therewith a stored text-based equivalent;
upon finding one or more signal samples having said pre-defined characteristics, storing one or more pointers pointing to said found signal samples in said non-text message;
storing said one or more pointers pointing to said found signal samples in an envelope for said non-text message;
wherein said searching comprises, for each set of a plurality of sets of pre-defined characteristics, searching said non-text message for one or more signal samples having said each set of pre-defined characteristics; and
wherein said one or more pointers are signal sample pointers and further comprising, for said each set of pre-defined characteristics, storing a pre-defined characteristics pointer in said envelope pointing to an area in a memory in which said each set of pre-defined characteristics is stored and storing in association with said pre-defined characteristics pointer a description of a search effected by searching said non-text message for one or more signal samples having said each set of pre-defined characteristics.

13. The method of claim 12 wherein said sets of pre-defined characteristics are sets of characteristics specified by a user through a user interface.

14. A method of operating on a non-text message, comprising:
searching said non-text message for one or more signal samples having pre-defined characteristics by comparing said one or more signal samples with a stored template having said pre-defined characteristics, said pre-defined characteristics having associated therewith a stored text-based equivalent;
upon finding one or more signal samples having said pre-defined characteristics, storing one or more pointers pointing to said found signal samples in said non-text message;
wherein said non-text message is a facsimile message; and
displaying a part of said facsimile message pointed to by one of said found signal samples.

15. A method of operating on non-text messages comprising:
for each of one or more non-text messages,
searching each non-text message for one or more signal samples falling within one of a plurality of sets of pre-defined characteristics, each said one of said plurality of sets of pre-defined characteristics comprising at least one stored template having a pre-defined characteristic having associated therewith a stored text-based equivalent;
for each one or more signal samples found to fall within one of said sets of pre-defined characteristics, storing one or more pointers pointing to said found signal samples in association with said one of said sets of pre-defined characteristics in a message envelope for said each non-text message;
for each one or more signal samples found to fall within one of said sets of pre-defined characteristics, storing a text string in said message envelope for said non-text message based on text-based equivalents to said one or more sets of pre-defined characteristics; and
wherein said non-text message comprises a facsimile message and said operating on said non-text message comprises displaying said one or more signal samples associated with said text string.

* * * * *